US012600018B2

(12) United States Patent
Baba et al.

(10) Patent No.: US 12,600,018 B2
(45) Date of Patent: Apr. 14, 2026

(54) DRIVING TOOL

(71) Applicant: MAKITA CORPORATION, Anjo (JP)

(72) Inventors: Norikazu Baba, Anjo (JP); Masaya Nagao, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/904,158

(22) Filed: Oct. 2, 2024

(65) Prior Publication Data

US 2025/0135614 A1 May 1, 2025

(30) Foreign Application Priority Data

Nov. 1, 2023 (JP) ................................ 2023-187521

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/005* (2013.01); *B25C 1/008* (2013.01); *B25C 1/06* (2013.01)

(58) Field of Classification Search
CPC ......... B25C 1/047; B25C 1/005; B25C 1/008; B25C 1/06
See application file for complete search history.

(56) References Cited

U.S. PATENT DOCUMENTS 3,858,781 A * 1/1975 Obergfell ................ B25C 1/005 227/8
4,463,888 A * 8/1984 Geist ....................... B25C 1/005 227/126
6,199,739 B1 3/2001 Mukoyama et al.
7,344,058 B2 * 3/2008 Bruins .................... B25C 1/003 227/138
7,516,532 B2 * 4/2009 Wojcicki ............... B25C 5/1617 227/119
12,377,528 B2 * 8/2025 Nakajima ................. B25C 1/06
2002/0014511 A1 * 2/2002 Yamamoto .............. B25C 1/005 227/119
2003/0230622 A1 * 12/2003 Rotharmel .............. B25C 1/184 227/120
2016/0129573 A1 * 5/2016 Anstett ................... E04F 21/22 227/148
2016/0222680 A1 * 8/2016 Yang ....................... E04F 21/22
2017/0368672 A1 * 12/2017 Meyer ....................... B25C 1/06
(Continued)

FOREIGN PATENT DOCUMENTS

JP 3558884 B2 8/2004
JP 6766727 B2 10/2020

*Primary Examiner* — Shelley M Self
*Assistant Examiner* — Katie L Gerth
(74) *Attorney, Agent, or Firm* — OLIFF PLC

(57) ABSTRACT

A driving tool includes an extension that extends from a rear guide of a nose above a driving direction and is coupled to a magazine body by a coupling screw. The tool further includes an elastic member that is arranged in between the rear guide and the magazine body and is below the coupling screw in a driving direction. The elastic member absorbs rattling of the magazine body and is integrally provided with an impact receiving portion to mitigate impact at a forward motion end position of a pusher.

20 Claims, 8 Drawing Sheets

(56) References Cited

U.S. PATENT DOCUMENTS

| | | | | |
|---|---|---|---|---|
| 2023/0081815 | A1 * | 3/2023 | Wierzchon | B25C 1/005 227/120 |
| 2024/0300078 | A1 * | 9/2024 | Yoshikane | B25C 5/1617 |
| 2024/0391075 | A1 * | 11/2024 | Hietpas | B25C 1/005 |

* cited by examiner

DRIVING TOOL

CROSS-REFERENCE TO RELATED APPLICATIONS

This application claims priority to Japanese patent application serial number 2023-187521 filed Nov. 1, 2023, the contents of which are incorporated herein by reference in their entirety for all purposes.

BACKGROUND

The present disclosure relates to a driving tool for driving a driven member into a workpiece.

A conventional driving tool has a nose at a front part having an ejection port for driven members, and a magazine coupled to the nose. The magazine is capable of storing the driven members. The driven members stored in the magazine may be pushed in a feeding direction, for example, by a pusher and fed one by one into a driving channel of the nose.

A leading end of the magazine in the feed direction is assembled to the nose via screw coupling with an elastic member interposed to absorb rattling. Apart from rattling absorption for assembly, an elastic member is interposed in the leading end of the magazine or the pusher to absorb impact at a stroke end position of the pusher. The present disclosure aims to reduce a number of components and cost by compactly arranging an elastic member, that has a rattle absorbing function between the magazine and the nose at the coupled part, and an elastic member that has an impact absorption function of the pusher.

SUMMARY

According to one aspect of the present disclosure, a driving tool may have, for example, a tool body, a nose, and a magazine. The nose is provided on the tool body and has an ejection port through which a driven member is ejected. The magazine stores the driven members. The magazine is coupled to the nose via a coupling member. An elastic member is provided between the nose and the magazine at a position that is below the coupling member in the driving direction.

Therefore, the coupling member and the elastic member are compactly arranged to reduce the number of components and cost.

According to another aspect of the present disclosure, a driving tool may have, for example, a tool body, a nose, and a magazine. The nose is provided on the tool body and has an ejection port through which a driven member is ejected. The magazine stores the driven members. The magazine is coupled to the nose via a coupling member. A pusher pushes the driven member(s) stored in the magazine toward the nose. An elastic member is provided in between the nose and the magazine. The elastic member includes a rattle absorbing part to absorb rattling of the magazine with respect to the nose and an impact receiving portion to which the pusher comes in contact when the pusher reaches an end position in a feeding direction of the driven member as a single member.

Therefore, the elastic member has a rattle absorbing function between the magazine and the pusher at the coupled part and an impact absorbing function of the pusher. The elastic members are compactly arranged to reduce the number of components and costs.

DETAILED DESCRIPTION

Figure 1:
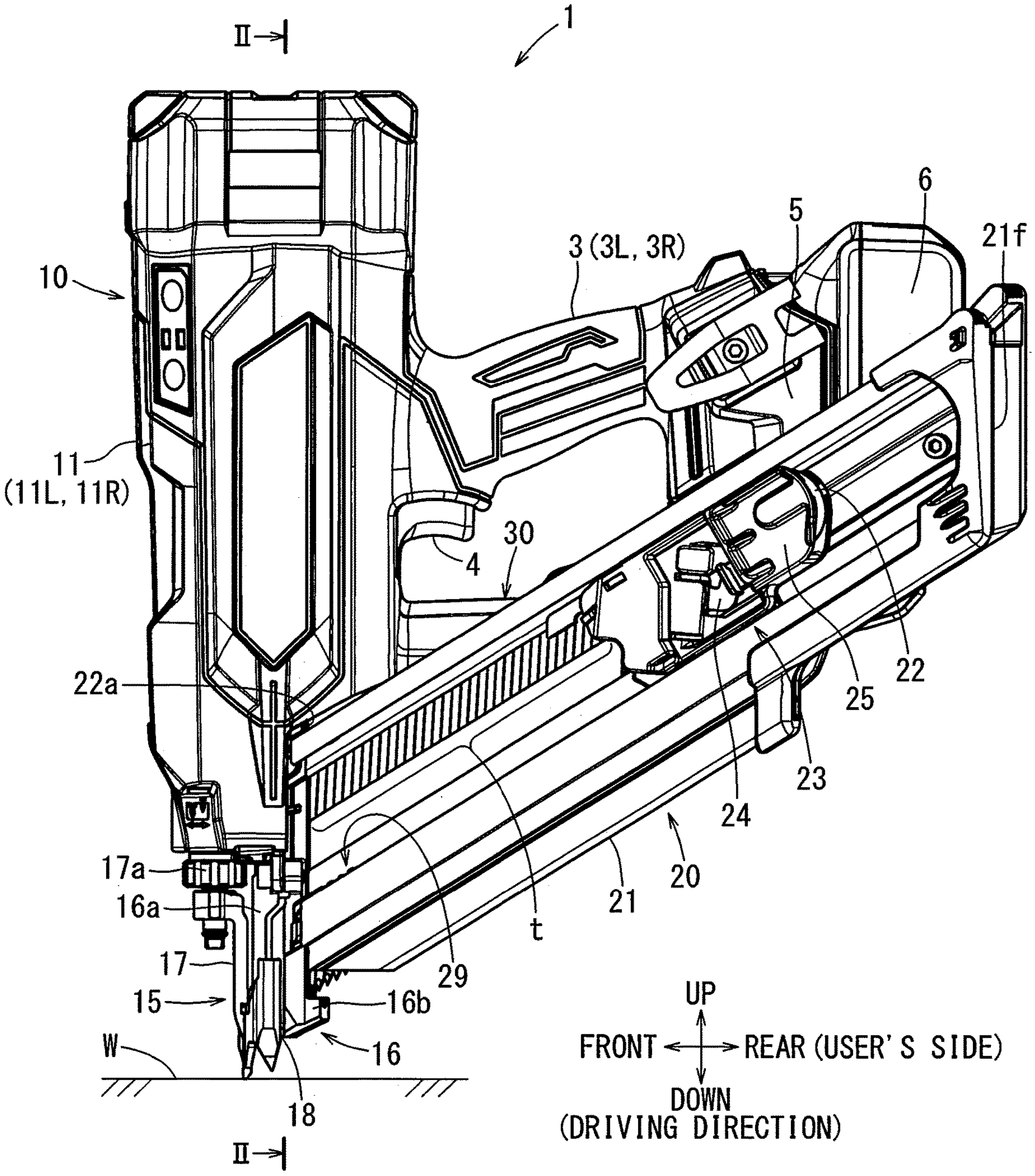
FIG. 1 is a left side view of a driving tool.

In one embodiment, the nose may have an extension that extends toward the magazine at its upper position in a driving direction. The extension may have an upper surface that contacts the magazine in a surface contact manner. The extension is coupled to the magazine via the coupling member with an upper surface in contact with the magazine in the surface contact manner. Therefore, the magazine is precisely positioned with respect to the nose by coupling the upper surface of the extension to the magazine in the surface contact manner due to the reaction force of the elastic member when the magazine is assembled. This ensures a stable feed of driven members from the magazine to the nose.

In another embodiment, a single coupling member is provided to simplify the assembly work and reduce the weight of the driving tool.

In another embodiment, the magazine may have a pusher configured to push stored driven members toward the nose. The elastic member has an impact receiving portion to which the pusher comes in contact when the pusher reaches an end position in the feeding direction of the driven member. Thus, the impact is absorbed when the pusher reaches the end position such that the durability of the driving tool is enhanced.

In another embodiment, the magazine has a guide rail configured to guide the pusher in the feeding direction of the driven member. An elastic member may be arranged on the guide rail. Thus, the elastic member may be compactly arranged.

In another embodiment, the guide rail has a bottom surface opposite a front surface of the pusher in the driving direction. The guide rail has a first surface standing from the bottom surface along a left side of the pusher and a second surface standing from the bottom surface along a right side of the pusher. At least a part of the elastic member is disposed within an area defined by the bottom surface, the first surface, and the second surface. Accordingly, at least a part of the elastic member is compactly arranged in the U-shaped guide rail.

In another embodiment, the elastic member may be pressed against and attached to the bottom surface of the guide rail. Thus, the elastic member may be held on the guide rail without rattling.

In another embodiment, the impact receiving portion may have a receiving surface being in contact with the pusher. The receiving surface is inclined with respect to a movement direction of the pusher so that the impact receiving portion is pressed against the bottom surface of the guide rail by the force received from the pusher. Thus, the elastic member may be prevented from coming off from the guide rail.

In another embodiment, the elastic member has a receiving surface of the impact receiving portion that contacts the pusher and a groove that is parallel to the receiving surface for enhancing the impact absorbing capacity of the receiving surface.

In another embodiment, the tool body has a driver that strikes a driven member and a piston to which the driver is coupled. The piston moves in the driving direction by compressed gas generated by the movement of the piston in a direction opposite to the driving direction. Therefore, the elastic member may be compactly arranged between the nose and the magazine for the gas spring type driving tool that uses the thrust of the compressed gas as the driving force.

In another embodiment, the magazine is coupled to the nose and the tool body so that the magazine may be more firmly supported without rattling in the gas spring type driving tool.

EMBODIMENTS

Embodiments of the present disclosure relate to a gas spring type driving tool, which is one of driving tools 1. The gas spring type driving tool has a pressure accumulation chamber above the cylinder and uses the gas pressure in the pressure accumulation chamber as a thrust for driving driven member t. For example, a rod-shaped nail may be used for the driven member t. In the following description, the driving direction of the driven member t is referred to as a downward direction and a counter-driving direction is referred to as an upward direction. The user of the driving tool 1 is positioned on the right side (grip 3 side) of the driving tool 1 in FIG. 1. The side in front of the user is referred to as a back direction (user side), and the side opposite the front side is referred to as a front direction. Left-right direction is a direction with respect to the user grasping the grip 3.

Figure 2:
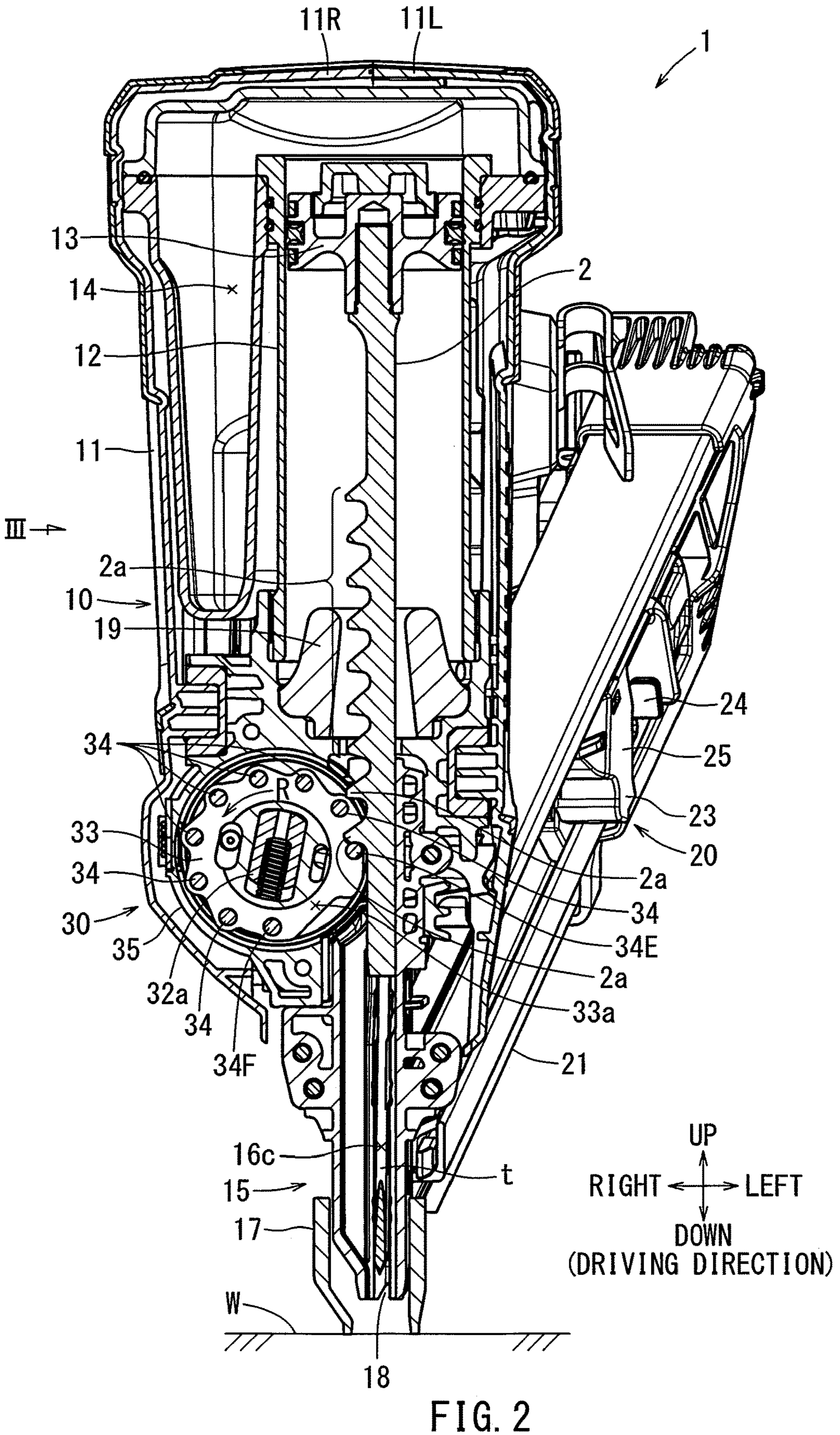
FIG. 2 is a cross sectional view taken along line II-II in FIG. 1 and a longitudinal sectional view of a tool body. This figure shows a driver in a stand-by position.
Figure 3:
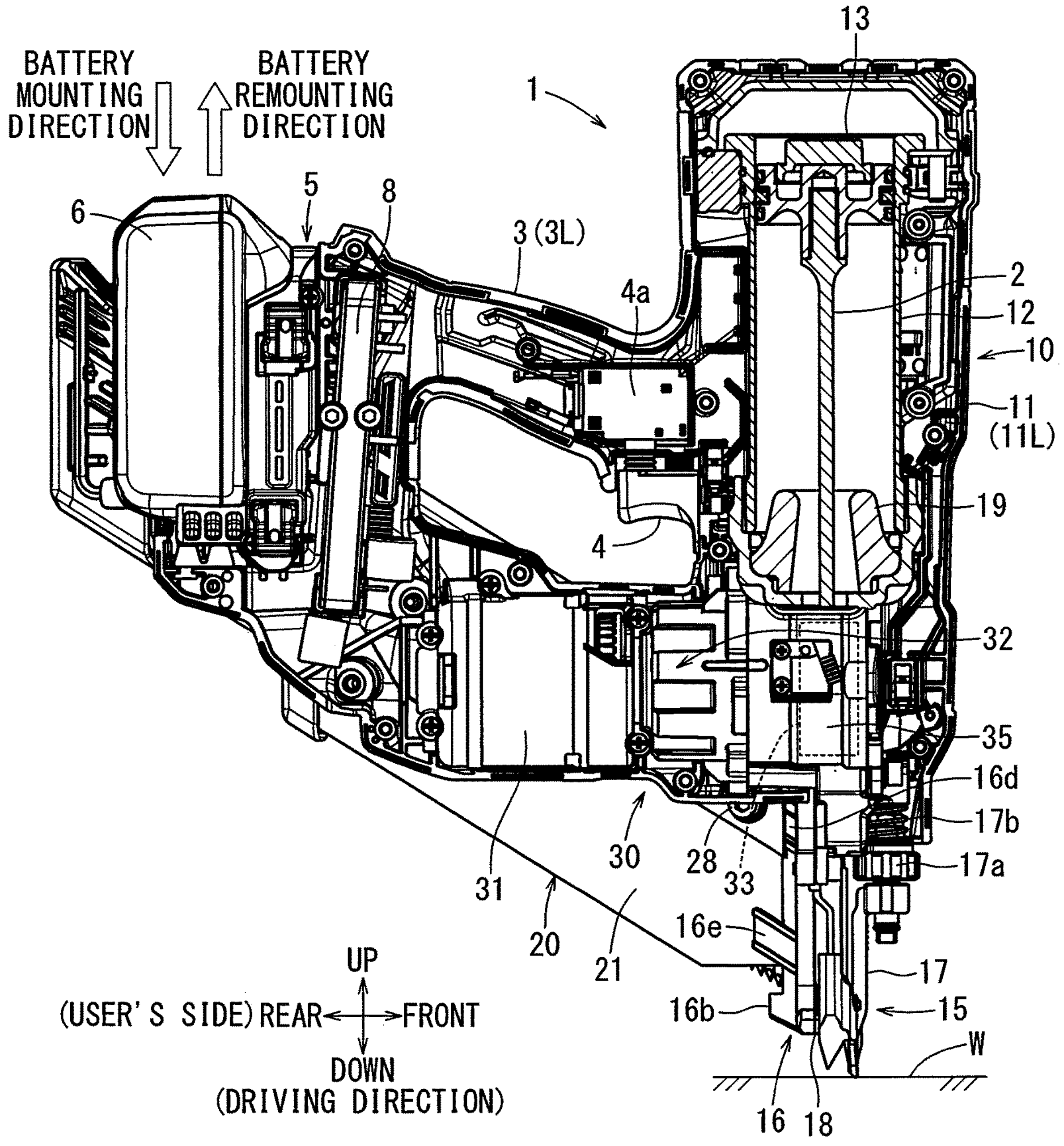
FIG. 3 is a right side view of the driving tool. This figure shows an interior of the driving tool by removing a right side half-split housing.

As shown in FIGS. 1 to 3, the driving tool 1 has a tool body 10. The tool body has a body housing 11 made of resin. The body housing 11 has a left-right half-split structure with left-right half-split housings 11L, 11R mutually facing each other and screw-coupled together. A cylinder 12 is housed in the body housing 11. A piston 13 is vertically reciprocally housed in the cylinder 12. A long driver 2 is coupled to a center of a lower surface of the piston 13. A lower part of the driver 2 enters a driving channel 16*c*, which will be described later. An upper part of the cylinder 12 above the piston 13 communicates with a pressure accumulation chamber 14. The pressure accumulation chamber 14 is filled with compressed gas, such as, for example, air. The gas pressure in the pressure accumulation chamber 14 acts on an upper surface of the piston 13 as a thrust to cause the piston 13 to move downward.

A nose 15 is provided at a lower part of the tool body 10. The nose 15 has a driver guide 16 and a contact arm 17. The driver guide 16 has a front guide 16*a* and a rear guide 16*b*. The front guide 16*a* and the rear guide 16*b* are mutually coupled to each other to form the driver guide 16. A driving channel 16*c* is defined between the front guide 16*a* and the rear guide 16*b*. The driving channel 16*c* communicates with an inner circumference of the cylinder 12. The driver 2 enters the driving channel 16*c* in a vertically reciprocally movable manner.

The contact arm 17 is vertically displaceably supported around the driver guide 16. The contact arm 17 extends upward from a periphery of a lower end (ejection port 18) of the driver guide 16. As shown in FIG. 3, the contact arm 17 is biased downward to an OFF position by a compression spring 17*b*. In the off position, a lower end of the contact arm 17 is positioned below the ejection port 18.

A pull operation of the switch lever 4 becomes effective when the contact arm 17 is moved upward (ON operation) with respect to the tool body 10 while being pressed against the workpiece W. A dial 17*a* for adjusting a driving depth is provided below the compression spring 17*b*. By turning the dial 17*a*, the OFF position of the contact arm 17 can be displaced up and down. This changes the stroke of the contact arm 17 and the position of the ejection port 18 with respect to the workpiece W during the ON operation. As a result, the driven depth of the driven member t into the workpiece W may be changed.

As shown in FIG. 1, a magazine 20 is coupled to a rear side of the nose 15. A plurality of driven members t is loaded into the magazine 20. The magazine 20 has a magazine body 21 to store the plurality of driven members t and a pusher 23 to push the stored driven members t toward the driving channel 16*c* of the nose 15. The pusher 23 pushes the plurality of driven members t and one of driven members t is fed into the driving channel 16*c* from inside of the magazine body 21. The driven member t is struck by the downwardly moving driver 2 and ejected from the ejection port 18.

A grip 3 is provided on the rear side of the tool body 10 for the user to grasp. The grip 3 has a half-split structure. Specifically, the grip 3 has a left grip housing 3L integrally formed with a left portion of the body housing 11 and a right grip housing 3R integrally formed with a right portion of the body housing 11. The left and right grip housings 3L and 3R are faced each other and screw-coupled together. On a front lower side of the grip 3, a starting switch lever 4 is provided, which is pulled by the user's fingertips. As shown in FIG. 3, a switch body 4*a* is internally mounted above the switch lever 4. When the switch lever 4 is pulled upward, the switch body 4*a* turns on. When the switch body 4*a* is turned on, electric power is supplied to a lift mechanism 30, which will be described later.

As shown in FIG. 3, a battery mounting section 5 is provided at a rear portion of the grip 3. One battery 6 is mounted on the battery mounting section 5. The battery 6 is slidably moved downward and mounted to the battery mounting section 5. The mounted battery 6 is slidably moved upward and removed from the battery mounting section 5. The battery 6 is removed from the battery mounting section 5 and charged with a separately prepared charger so that it can be used repeatedly. The battery 6 is versatile enough to be used as a power source for other power tools. An electric motor 31 of the lift mechanism 30 operates with electric power from the battery 6 as a power source.

A rectangular flat-plate controller 8 is provided within the battery mounting section 5. The controller 8 is disposed along a front side of the mounted battery 6 extending upward and downward. The lift mechanism 30 is activated by the ON operation of the switch lever 4 and the ON operation of the contact arm 17 to start the driving operation. The controller 8 mainly controls the operation of the electric motor 31 of the lift mechanism 30.

As shown in FIG. 2, a downward motion end damper 19 is disposed at a lower part of the cylinder 12 to absorb impact at a downward motion end of the piston 13. A lower part of the driver 2 passes through an inner circumferential side of the downward motion end damper 19 and enters the driving channel 16*c*. The driver 2 moves downward within the driving channel 16*c* by the gas pressure in the pressure accumulation chamber 14 acting on the upper surface of the piston 13. An end (lower end) of the driver 2 strikes one driven member t fed in the driving channel 16*c*. When the piston 13 reaches the downward motion end, the driven member t is ejected from the ejection port 18. The driven member t is driven into the workpiece W.

As shown in FIG. 3, a lift mechanism 30 is provided below the grip 3. The lift mechanism 30 has an electric motor 31 as a drive source. One wheel 33 is supported in front of the electric motor 31 via a reduction gear train 32. As shown in FIG. 2, a mechanism case 35 covers around the wheel 33. The driver 2 and piston 13, which have reached the downward motion end, are returned by the lift mechanism 30 to the upper stand-by position (in a direction opposite to the driving direction of the driven member t). The wheel 33 is supported on an output shaft 32*a* of the reduction gear train 32. The wheel 33 rotates in a direction indicated by an arrow R in FIG. 2 (counterclockwise direction in the figure). This causes the driver 2 to return upward (counter-driving direction).

As shown in FIG. 2, for example, nine engaging portions 2*a* may be provided on a right side of the driver 2. Each engaging portion 2*a* has a rack-tooth shape projecting to the right. The plurality of engaging portions 2*a* are arranged at regular intervals in the longitudinal direction (up-down direction) of the driver 2. The wheel 33 of the lift mechanism 30 sequentially engaged with the plurality of engaging portions 2*a*.

As shown in FIG. 2, the wheel 33 is disposed on the right side of the driver 2. The wheel 33 may have, for example, nine engaging portions 34 that are sequentially engaged with the engaging portions 2*a* of the driver 2. A cylindrical shaft member is used for each engaging portion 34. The nine engaging portions 34 are disposed at regular intervals along an outer circumferential edge of the wheel 33. The first engaging portion 34 to engage the engaging portion 2*a* of the driver 2 that has reached the downward motion end by a rotational movement of the wheel 33 in the direction of the arrow R is denoted by the reference numeral 34F, and the last engaging portion 34 is denoted by the reference numeral 34E to distinguish each as necessary.

An activation of the electric motor 31 shown in FIG. 3 causes the wheel 33 to rotate in the direction of the arrow R as shown in FIG. 2. After the driver 2 reaches the downward motion end by the driving operation, the rotation of wheel 33 in the direction of the arrow R causes the driver 2 to be returned upward as the engaging portions 34 sequentially engage the engaging portions 2*a* of the driver 2 from below. The gas pressure in the pressure accumulation chamber 14 increases as the piston 13 returns upward by the lift mechanism 30. When the driver 2 returns to the stand-by position shown in FIG. 2 (the position where the last engaging portion 34E engages the engaging portion 2*a* of the driver 2), the electric motor 31 stops and the series of driving operations are completed.

As shown in FIG. 3, when the switch lever 4 is pulled again, the lift mechanism is restarted. As shown in FIG. 2, this causes the wheel 33 to begin rotating in the direction of the arrow R, which lifts the driver 2 and the piston 13 further upward from the stand-by position. As a result, the last engaging portion 34E is disengaged from the engaging portion 2A of the driver 2.

As shown in FIG. 2, a large interval in the rotational direction (a relief area 33*a* without engaging portion 34) is provided between the first engaging portion 34F and the last engaging portion 34E in the rotational direction of the wheel 33, indicated by the arrow R in FIG. 2. When this relief area 33*a* is directed toward the driver 2 by rotation of the wheel 33 in the direction of the arrow R, the engagement of the wheel 33 with all engaging portions 2*a* of the driver 2 released. This causes the piston 13 and driver 2 to move downward due to the gas pressure in the pressure accumulation chamber 14 acting on the piston 13. The driver 2 moves downward in the driving channel 16*c* to strike the driven member t. The driven member t is struck into the workpiece W.

Figure 4:
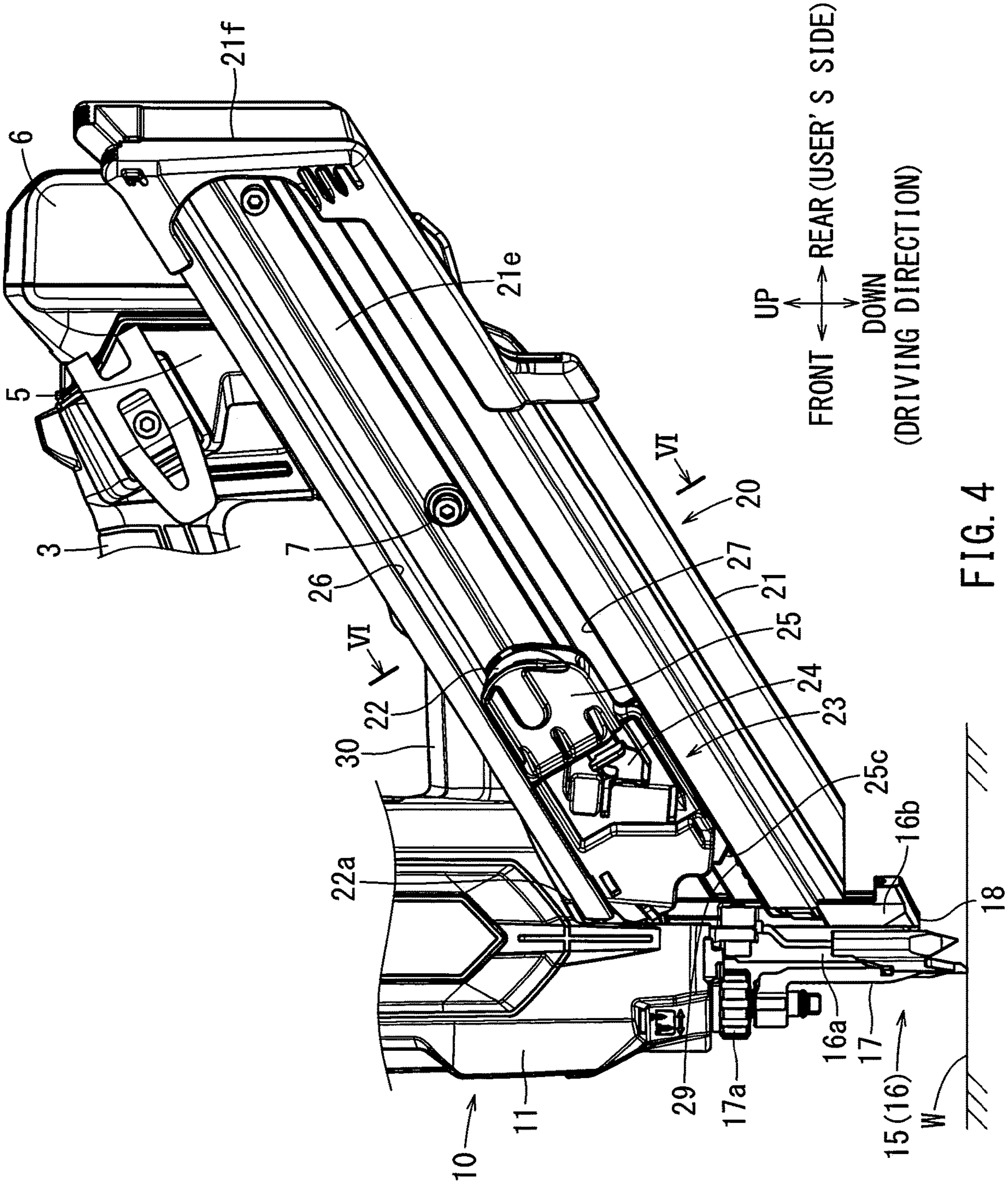
FIG. 4 is a left side view of a nose and a magazine.

The magazine 20 is coupled to a rear guide 16*b* of the driver guide 16. The magazine 20 has a long magazine body 21 made of a drawn aluminum material. A plurality of driven members t temporarily fixed in parallel are loaded inside the magazine body 21 (see FIG. 1). FIG. 4 shows the magazine body 21 without the driven members t with the pusher 23 positioned at the advancing end of the magazine body 21.

The magazine body 21 extends from the rear side of the driver guide 16 in a diagonally leftward and upward inclined direction. The magazine body 21 has a length that passes by the left side of the battery mounting section 5. As shown in FIG. 4, the magazine body 21 is coupled near a lower part of the battery mounting section 5 by means of a fixing screw 7. The fixing screw 7 may be tightened, for example, to a nut embedded in the left half-split housing 11L. This allows the magazine 20 to be firmly supported over the nose 15 and the battery mounting section 5.

Figure 6:
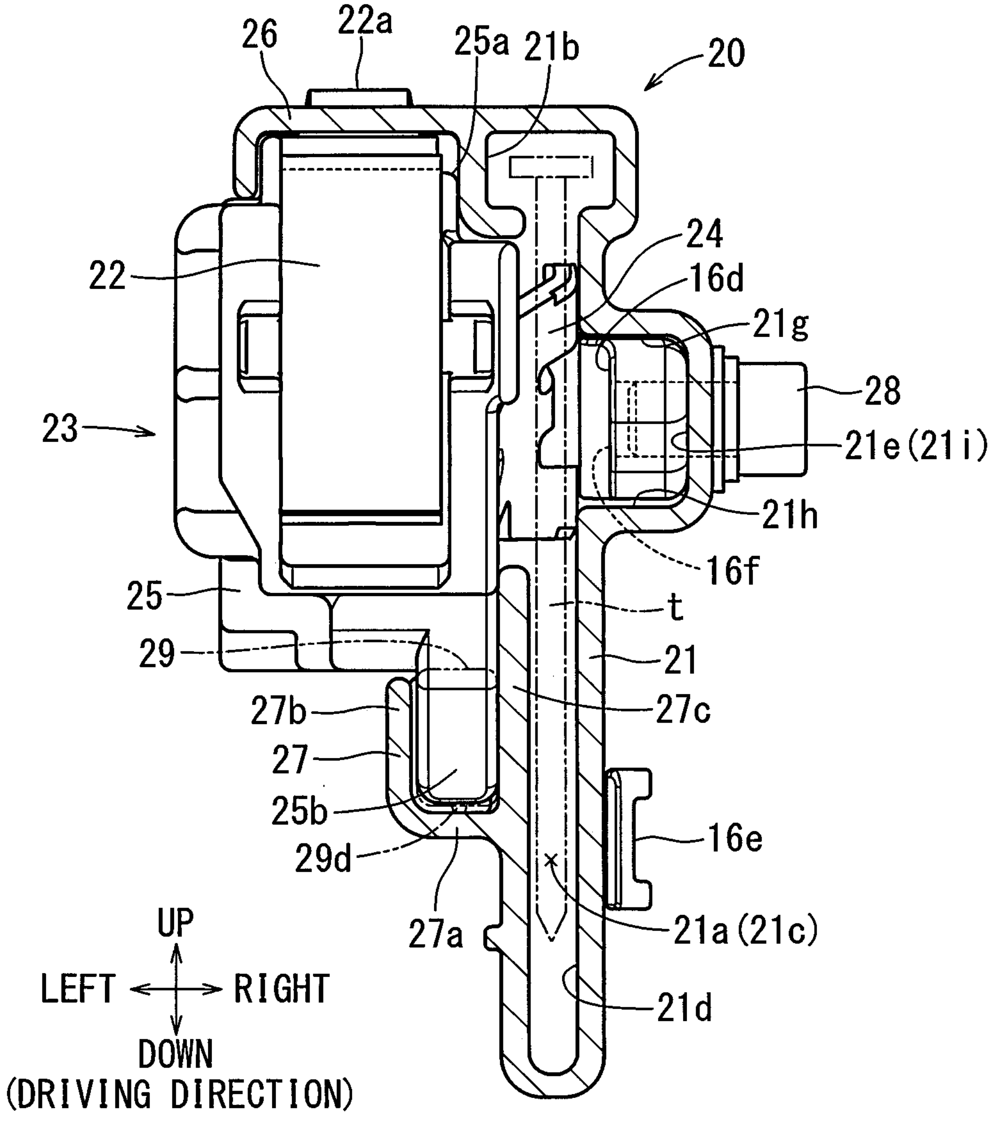
FIG. 6 is a cross sectional view taken along line VI-VI in FIG. 4 and a horizontal sectional view of the magazine.

A loading port 21*f* is opened at the rear of the magazine body 21. The plurality of driven members t temporarily fixed in a flat shape is loaded into a housing section 21*a* of the magazine body 21 through the loading port 21*f*. As shown in FIG. 6, the housing section 21*a* is a flat space in which the driven members t can be stored along the upward and downward direction. A head housing section 21*b* is formed at a top of the housing section 21*a* to hold heads of the driven members t. A shaft housing section 21*c* extends downward from the head housing section 21*b*. Shafts of the driven members t are accommodated in the shaft portion housing section 21*c*. The driven members having different shaft lengths may be accommodated in the housing section 21*a* with their heads in a common position.

Figure 7:
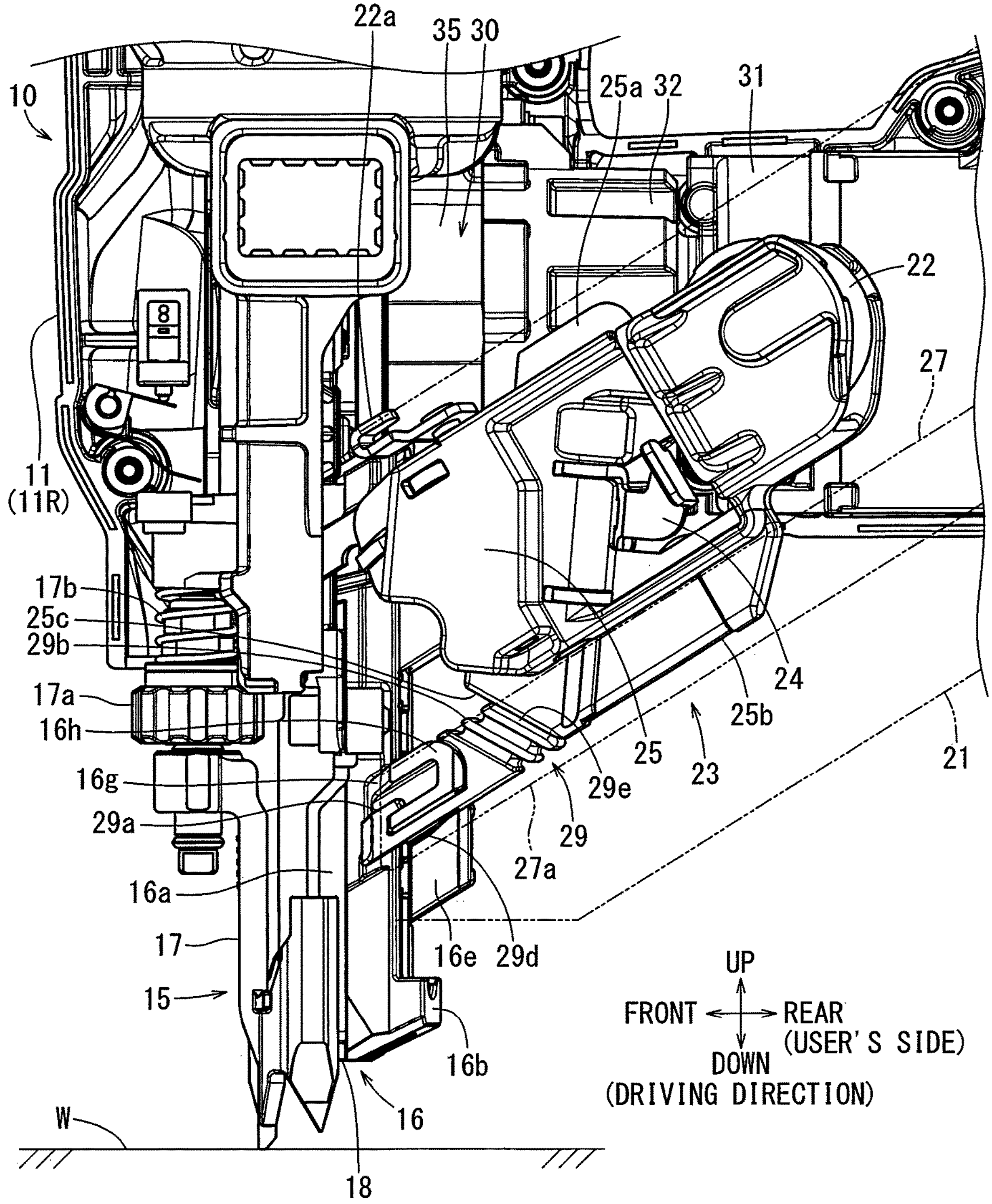
FIG. 7 is a left side view of a pusher in an advancing end relative to the nose.

As shown in FIG. 6, the pusher 23 locates at a left side of the housing section 21*a*. As shown in FIG. 7, the pusher 23 has a pusher claw 24 to push the drive driven members t toward the driving channel 16*c* and a holder 25 to support the pusher claw 24. The holder 25 has guiding edges 25*a* and 25*b* at its top and bottom. The magazine 21 has an upper guide rail 26 and a lower guide rail 27 located on its left side. As shown in FIG. 6, the upper guiding edge 25*a* is held by the upper guide rail 26 and the lower guiding edge 25*b* is held by the lower guide rail 27 respectively. This configuration allows the holder 25 to be slidably supported along the longitudinal direction of the magazine body 21 (feeding direction and counter-feeding direction of the driven member t).

As shown in FIG. 6, the pusher claw 24 is supported in a rotatable manner to left and right via a support shaft by the holder 25. The pusher claw 24 is biased in a direction to allow an end of the pusher claw 24 to contact a bottom 21*d* of the housing section 21*a* by a compression spring. By retracting the pusher claw 24 in a direction away from the bottom 21*d*, the plurality of driven members t loaded from the loading port 21*f* passes by a right side of the pusher 23 and are loaded on a front side of the pusher 23. A rear end of the plurality of driven members t that have been loaded is pushed by the pusher claw 24 that is returned into the housing section 21*a*.

As shown in FIG. 7, a leaf spring 22 biases the pusher 23 toward the driving channel 16*c* and locates at a rear side of the holder 25. The leaf spring 22 is wound in a coil shape. A base end of the winding of the leaf spring 22 is coupled to the holder 25. A tip end 22*a* of the winding of the leaf spring 22 is hooked to a front end of the magazine body 21. The pusher 23 operates manually against the biasing force of the leaf spring 22 to return the pusher 23 to a direction away from the driving channel 16*c* (counter-feeding direction).

Figure 5:
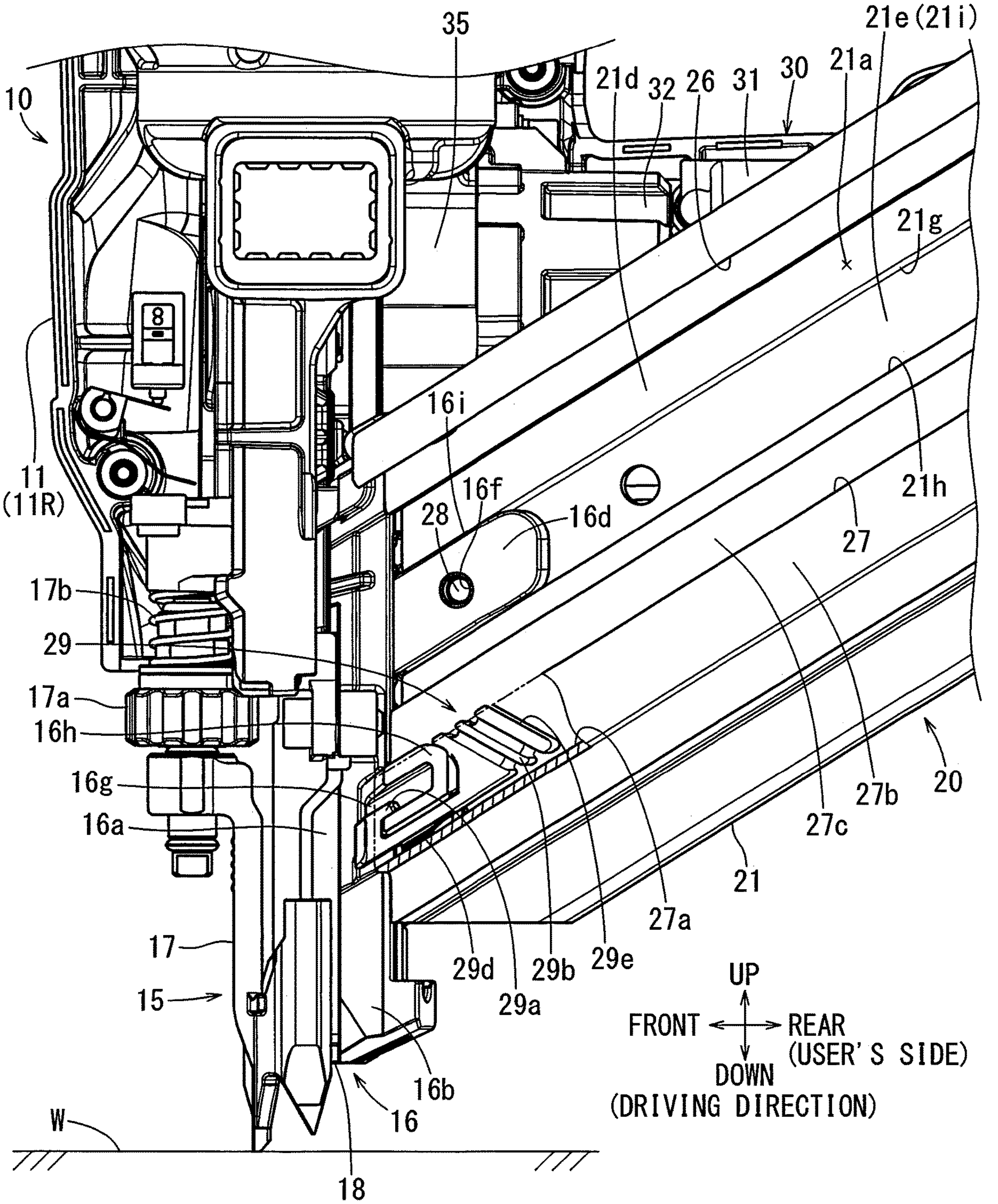
FIG. 5 is a left side view of a coupled part of the magazine with respect to the nose.

As shown in FIGS. 4 to 6, the bottom 21*d* of the magazine body 21 has a groove 21*e* that is recessed to the right. The groove 21*e* has a rectangular cross section and is formed along the entire length of the magazine body 21 in the longitudinal direction. The groove 21*e* has an upper wall section 21*g* and a lower wall section 21*h* facing each other up and down, and a bottom section 21*i* extending between the upper wall section 21*g* and the lower wall section 21*h*. The fixing screw 7 is tightened to the bottom section 21*i*.

As shown in FIGS. 3, 5 and 6, the rear guide 16*b* of the nose 15 has an upper extension 16*d* and a lower extension 16*e*. These two extensions 16*d*, 16*e* have a strip shape, respectively and extend toward the magazine 20. The extensions 16*d* and 16*e* extend along the feeding direction of the driven member t. The upper extension 16*d* enters the groove 21*e* of the magazine body 21. The upper extension 16*d* contacts the bottom section 21*i* of the groove 21*e*. One threaded hole 16*f* is formed in the upper extension 16*d*. As shown in FIGS. 3 and 6, one coupling screw 28 inserted from the right side of the magazine body 21 is tightened into the threaded hole 16*f*. Thereby, above the driving direction, the magazine body 21 is screw-coupled to the rear guide 16*b* of the driver guide 16.

As shown in FIG. 5, while the magazine body 21 is coupled, an upper surface 16*i* of the extension 16*d* contacts the upper wall section 16*i* of the groove 21*e* in a surface contact manner. This allows the magazine 20 to be precisely assembled with respect to the nose 15 to stably feed driven members t.

As shown in FIG. 5, the upper extension 16*d* enters the groove 21*e* such that the upper extension 16*d* substantially contacts with the upper wall section 21*g* and lower wall section 21*h* of the groove 21*e*. This prevents the magazine body 21 from rattling in the up-down direction against the upper extension 16*d*.

As shown in FIGS. 6 and 7, the lower extension 16*e* contacts a right side of the magazine body 21 to prevent rattling of the magazine body 21 that is mainly at the lower part in the left-right direction.

As shown in FIGS. 5 and 7, an attachment portion 16*g* below the upper extension 16*d* extends toward the magazine 20. The upper and lower extensions 16*d*, 16*e* and the attachment portion 16*g* extend parallel to each other. The attachment portion 16*g* is provided below the upper extension 16*d*. The attachment portion 16*g* enters the lower guide rail 27 of the magazine body 21.

Figure 8:
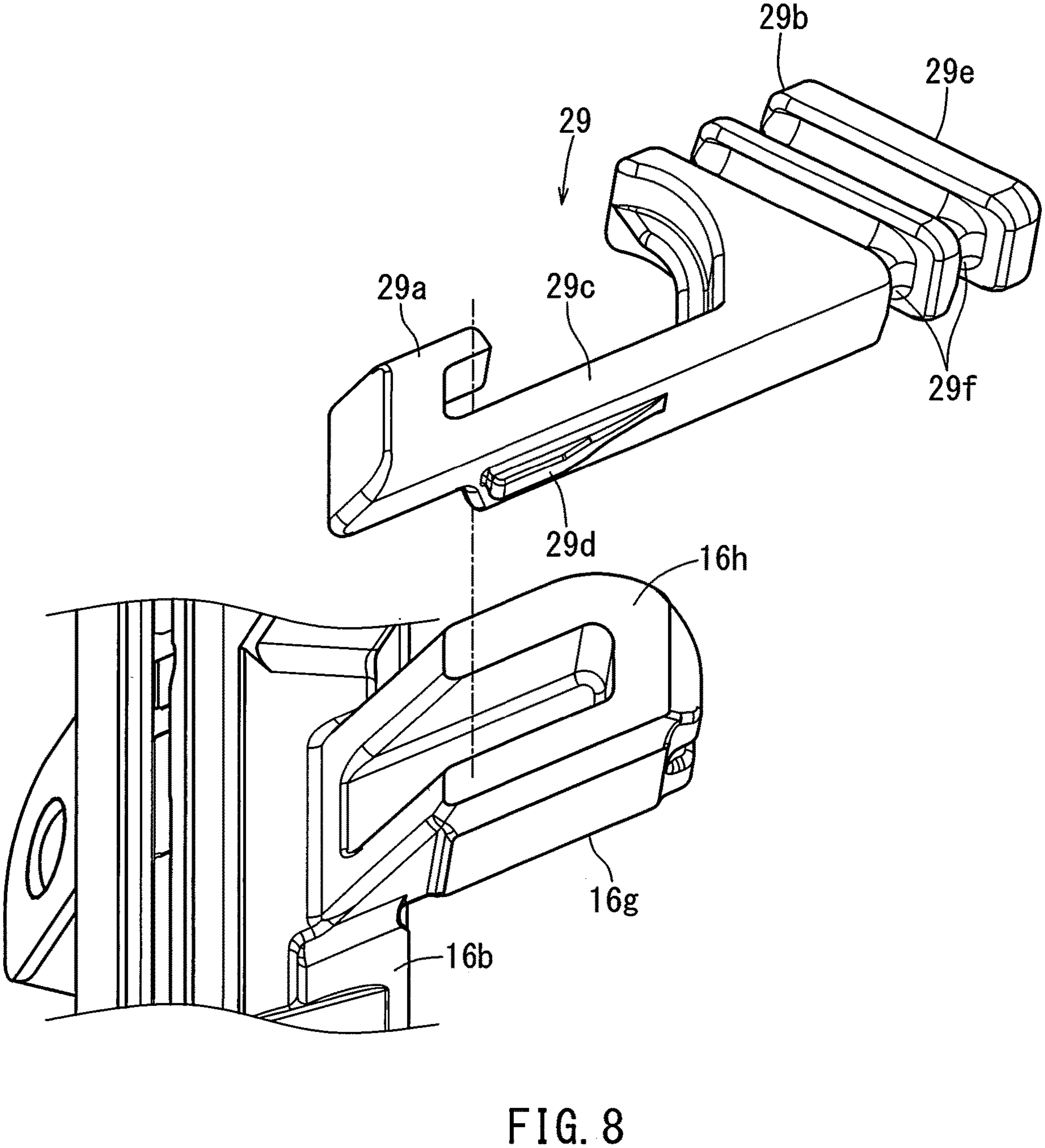
FIG. 8 is an exploded perspective view of the elastic member and an attachment portion.

As shown in FIG. 7, one elastic member 29 is attached to the attachment portion 16*g*. A left side of the attachment portion 16*g* is provided with an engagement wall 16*h* bent in a U-shape. As shown in FIG. 8, an elastic member 29 is integrally molded from an elastic rubber material. The elastic member 29 has an engaging portion 29*a* at its front that is bent in a U-shape, an impact receiving portion 29*b* at its rear, and a connecting portion 29*c* configured to connect the engaging portion 29*a* and the impact receiving portion 29*b*.

As shown in FIG. 8, the front engaging portion 29*a* engages along a lower part of the engagement wall 16*h*, and the elastic member 29 is supported by the attachment portion 16*g*. The impact receiving portion 29*b* contacts a rear side of the engagement wall 16*h*. The connecting portion 29*c* contacts along a lower surface of the engagement wall 16*h*.

As shown in FIG. 7, the attachment portion 16*g* of the driver guide 16 enters the lower guide rail 27 of the magazine body 21. Thus, as shown in FIG. 6, the elastic member 29 is held within the lower guide rail 27. The lower guide rail 27 has a bottom surface 27*a*, a first surface 27*b*, and a second surface 27*c*. The bottom surface 27*a* faces a front surface (under surface) of the guiding edge 25*b* of the pusher 23 in the driving direction. The first surface 27*b* stands from the bottom surface 27*a* along a left side of the guiding edge 25*b*. The second face 27*c* stands from the bottom surface 27*a* along a right side of the guiding edge 25*b*. The elastic member 29 is disposed between the bottom surface 27*a*, the first surface 27*b* and the second surface 27*c* of the guide rail 27.

As shown in FIG. 8, a protrusion 29*d* is formed on a lower surface of the connecting portion 29*c* of the elastic member 29. The protrusion 29*d* protrudes slightly downward from the lower surface of the connecting portion 29*c* and is formed integrally. As shown in FIG. 6, the protrusion 29*d* is pressed against the bottom surface 27*a* of the guide rail 27. The protrusion 29*d* is pressed against the bottom surface 27*a* of the guide rail 27 when the magazine 20 is assembled to the driver guide 16. As a result, the protrusion 29*d* serves as a crush allowance for absorbing rattling.

As shown in FIG. 5, an elastic member 29 is interposed between the attachment portion 16*g* and the guide rail 27 of the magazine body 21. With this structure, the elastic member 29 serves as a rattle absorbing part to absorb rattling of the magazine 20 against the nose 15.

As shown in FIG. 7, the impact receiving portion 29*b* has a receiving surface 29*e* that comes in contact with the pusher 23. The holder 25 of the pusher 23 has a contact surface 25*c* that is brought into contact with the receiving surface 29*e* when the pusher 23 reaches the upward motion end. The contact surface 25*c* is provided at a front of the lower guiding edge 25*b*.

As shown in FIG. 7, the receiving surface 29*e* of the elastic member 29 and the contact surface 25*c* of the pusher 23 are parallel to each other. Therefore, the receiving surface 29*e* and the contact surface 25*c* come in contact with each other in a surface contact manner. The receiving surface 29*e* and the contact surface 25*c* are both inclined in a counter-clockwise direction in FIG. 7 with respect to a direction orthogonal to the movement direction of the pusher 23 (driving direction of the driven member t). Thus, the impact force received by the impact receiving portion 29*b* from the pusher 23 that has reached the upward motion end acts mainly in a direction of pushing the impact receiving portion 29*b* of the elastic member 29 against the bottom surface 27*a* of the guide rail 27. This prevents the elastic member 29 from being misaligned, and the impact at the upward motion end of pusher 23 is efficiently absorbed by the impact receiving portion 29*b*.

As shown in FIG. 8, the impact receiving portion 29*b* has two grooves 29*f* that are parallel to the receiving surface 29*e*. These two grooves 29*f* enhance the impact absorption capacity of the impact receiving portion 29*b*.

According to the examples described above, the upper extension 16*d* on the rear guide 16*b* of the driver guide 16 comes in contact with the upper wall 21*g* of the magazine body 21 in a surface contact manner above the driving direction as shown in FIG. 5. The driver guide 16 is screw-coupled and the magazine 20 is firmly coupled to the nose 15. As a result, the magazine 20 can be precisely positioned with respect to the nose 15, and a stable feed of driven members t from the magazine 20 to the nose 15 can be ensured.

As shown in FIG. 7, the pusher 23 has an elastic member 29 that is brought into contact with the pusher 23 when the pusher 23 reaches the end of the driven members t in the feeding direction. Thus, the impact of the pusher 23 when it reaches the end is absorbed such that the durability of the driving tool 1 may be enhanced.

As shown in FIG. 7, the elastic member 29 is arranged on the lower guide rail 27 that guides the pusher 23 in the feeding direction of the driven member t. Thus, the elastic member 29 may be compactly arranged using the guide rail 26 of the pusher 23.

As shown in FIG. 6, the lower guide rail 27 has a bottom surface 27*a* facing the front surface (under surface) of the pusher 23 in the driving direction. The guide rail 27 has a first surface 27*b* standing from the bottom surface 27*a* along the left side of the pusher 23 and a second surface 27*c* standing from the bottom surface 27*a* along the right side of the pusher 23. The elastic member 29 is disposed between the bottom surface 27*a*, the first surface 27*b*, and the second surface 27*c*. Thus, the elastic member 29 may be compactly arranged within the U-shaped guide rail 27.

As shown in FIG. 7, the elastic member 29 is pressed against and attached to the bottom surface 27*a* of the guide rail 27 by a crush allowance (e.g., the protrusion 29*d* in FIG. 8). Thus, the elastic member 29 is held on the guide rail 27 without rattling. As a result, the magazine 20 is coupled to the nose15 without rattling.

As shown in FIG. 7, the impact receiving portion 29*b* has a receiving surface 29*e* being in contact with the pusher 23. The receiving surface 29*e* is inclined with respect to the movement direction of the pusher 23 so that the impact receiving portion 29*b* is pressed toward the bottom surface 27*a* of the guide rail 27 by the force received from the pusher 23. Thus, the elastic member 29 is prevented from coming off from the guide rail 27.

As shown in FIG. 7, the elastic member 29 has a receiving surface 29*e* of the impact receiving portion 29*b* that comes in contact with the pusher 23 and a groove 29*f* parallel to the receiving surface 29*e*. Thus, the impact absorbing capacity of the receiving surface 29*e* may be enhanced.

As shown in FIG. 8, the elastic member 29 has a protrusion 29*d* as a rattle absorbing part (crush allowance) to absorb rattling of the magazine 20 with respect to the nose 15 in FIG. 7. The elastic member 29 has an impact receiving portion 29*b* configured to receive the impact when the pusher 23 in FIG. 7 reaches the end as a single member. Thus, the elastic member 29 may be compactly arranged.

As shown in FIG. 3, the driving tool 1 includes a piston 13 that moves in the driving direction by compressed gas and a driver 2 that is coupled to the piston 13 and strikes the driven member t. Therefore, the elastic member 29 (see FIG. 5) may be compactly arranged between the nose 15 and the magazine 20 in the gas spring type driving tool 1 that uses the thrust of compressed gas as the driving force.

As shown in FIG. 3, the driving tool 1 has a grip 3 for the user to grasp. The magazine 20 is coupled over the nose 15 and the grip 3. Therefore, the magazine 20 may be firmly supported without rattling in the gas spring type driving tool 1.

Various modifications may be made to the examples described above. For example, the upper extension 16*d* shown in FIG. 5 may be formed longer and secured to the bottom 21*i* of the groove 21*e* with two coupling screws 2. This allows the magazine body 21 to be coupled more firmly to the nose 15 and rattling of the magazine body 21 may be further suppressed.

The driver guide 16 shown in FIG. 5 consists of two components such as a front guide 16*a* and a rear guide 16*b*. Alternatively, the driver guide may be composed of a single member.

In the above examples, a coupling screw 28 is utilized as a coupling member to couple the magazine 20 to the nose 15. Alternatively, a rivet, clip, or adhesive means such as brazing may be used as a coupling member.

In the above examples, the elastic member 29 is attached by hooking the engaging portion 29*a* onto the engagement wall 16*h* of the attachment portion 16*g*. Alternatively, the elastic member may be attached to the attachment portion by means of screwing or adhesion.

The driving tool 1 in the above example is a gas spring type. Instead, the driving tool may be a mechanical spring type that uses biasing force of a compression spring as a thrust for driving.

What is claimed is:

1. A driving tool comprising:
- a tool body;
- a nose provided on the tool body and having an ejection port through which a driven member is ejected;
- a magazine that includes a guide rail configured to guide a pusher in a feeding direction of the driven member, wherein the magazine is configured to store a plurality of driven members;
- the pusher provided on the magazine and configured to push the driven members toward the nose;
- a coupling member configured to couple the magazine to the nose; and
- an elastic member provided between the nose and the magazine at a position that is below the coupling member in a driving direction,
- wherein the elastic member comprises:
  - a protrusion configured to be pressed against a bottom surface of the guide rail of the magazine, and
  - an impact receiving portion having a receiving surface inclined with respect to a movement direction of the pusher of the magazine, wherein the receiving surface faces away from the protrusion.

2. The driving tool according to claim 1, wherein the nose has an extension that extends toward the magazine at an upper portion of the nose in the driving direction,
- wherein the extension is coupled to the magazine via the coupling member, and
- wherein the extension has an upper surface configured to contact the magazine in a surface contact manner.

3. The driving tool according to claim 2, comprising a single coupling member as the coupling member.

4. The driving tool according to claim 1, wherein
- the impact receiving portion contacts the pusher when the pusher reaches an end position in the feeding direction of the driven member.

5. The driving tool according to claim 4, wherein the elastic member is arranged on the guide rail.

6. The driving tool according to claim 5, wherein the guide rail has the bottom surface being opposite a front surface of the pusher in the driving direction, a first surface standing from the bottom surface along a left side of the pusher, and a second surface standing from the bottom surface along a right side of the pusher, wherein at least a part of the elastic member is disposed within an area defined by the bottom surface, the first surface, and the second surface.

7. The driving tool according to claim 6, wherein the elastic member is pressed against and attached to the bottom surface of the guide rail.

8. The driving tool according to claim 6, wherein the impact receiving portion is pressed against the bottom surface of the guide rail by a force received from the pusher.

9. The driving tool according to claim 4, wherein the elastic member has a groove that is parallel to the receiving surface.

10. A driving tool comprising:
- a tool body;
- a nose provided on the tool body and having an ejection port through which a driven member is ejected;
- a magazine that includes a guide rail configured to guide a pusher in a feeding direction of the driven member, wherein the magazine is configured to store a plurality of driven members;
- the pusher configured to push each of the plurality of driven members toward the nose;
- a coupling member configured to couple the magazine to the nose, and
- an elastic member provided between the nose and the magazine,
- wherein the elastic member comprises:
  - a protrusion configured to be pressed against a bottom surface of the guide rail of the magazine, and
  - a rattle absorbing part configured to absorb rattling of the magazine with respect to the nose and an impact receiving portion to which the pusher comes in contact when the pusher reaches an end position in a feeding direction of the driven member as a single member, the impact receiving portion having a receiving surface inclined with respect to a movement direction of the pusher of the magazine, wherein the receiving surface faces away from the protrusion.

11. The driving tool according to claim 10, wherein the tool body has a driver configured to strike one of the plurality of driven members and a piston to which the driver is coupled, the piston moves in a driving direction by compressed gas generated by a movement of the piston in a direction opposite to the driving direction.

12. The driving tool according to claim 10, wherein the magazine is coupled to the nose and the tool body.

13. The driving tool according to claim 10, wherein the impact receiving portion further includes a plurality of grooves being parallel to the receiving surface.

14. A driving tool comprising:
- a tool body;
- a nose having a driver guide, wherein the driving guide has a front guide and a rear guide that are mutually coupled to each other;
- a driving channel defined between the front guide and the rear guide;
- a magazine that includes a guide rail configured to guide a pusher in a feeding direction of a driven member, wherein the magazine is coupled to a rear side of the nose;
- the pusher having a pusher claw configured to feed the driven member toward the driving channel and a pusher holder configured to support the pusher claw;
- a coupling member configured to couple the magazine to the nose; and
- an elastic member,
  - wherein the elastic member comprises:
    - a protrusion configured to be pressed against a bottom surface of the guide rail of the magazine,
    - a rattle absorbing part,
    - an impact receiving portion having a receiving surface inclined with respect to a movement direction of the pusher of the magazine, wherein the receiving surface faces away from the protrusion, and
    - an engaging portion.

15. The driving tool according to claim 14, wherein the guide rail includes an upper guide rail and a lower guide rail.

16. The driving tool according to claim 15, wherein the pusher holder has an upper guiding edge and a lower guiding edge, wherein the upper guiding edge is held by the upper guide rail and the lower guiding edge is held by the lower guide rail, respectively.

17. The driving tool according to claim 14, wherein the magazine is formed with a groove at a bottom, wherein the groove has an upper wall section, a lower wall section, and a bottom section extending between the upper wall section and the lower wall section.

18. The driving tool according to claim 14, wherein the rear guide has an upper extension and a lower extension.

19. The driving tool according to claim 18, wherein the upper extension further has an attachment portion provided below the upper extension, wherein the attachment portion is extendable toward the magazine and attachable to the elastic member.

20. The driving tool according to claim 14, wherein the elastic member further includes a connecting portion configured to connect the engaging portion and the impact receiving portion.

* * * * *